United States Patent
Ryan et al.

(10) Patent No.: US 12,505,532 B2
(45) Date of Patent: Dec. 23, 2025

(54) METHOD AND APPARATUS FOR AUTOMATED DEFECT DETECTION

(71) Applicant: Sonix, Inc., Springfield, VA (US)

(72) Inventors: Kevin Ryan, Silver Spring, MD (US); John J. Pickerd, Hillsboro, OR (US); Sam J. Strickling, Cypress, TX (US); Jeffrey J. Trgovich, Macedonia, OH (US)

(73) Assignee: Sonix, Inc., Springfield, VA (US)

( * ) Notice: Subject to any disclaimer, the term of this patent is extended or adjusted under 35 U.S.C. 154(b) by 449 days.

(21) Appl. No.: 17/986,524

(22) Filed: Nov. 14, 2022

(65) Prior Publication Data

US 2023/0153989 A1 May 18, 2023

Related U.S. Application Data

(60) Provisional application No. 63/324,342, filed on Mar. 28, 2022, provisional application No. 63/297,601, (Continued)

(51) Int. Cl.
*G01N 29/06* (2006.01)
*G01N 29/26* (2006.01)
*G06T 7/00* (2017.01)

(52) U.S. Cl.
CPC ......... *G06T 7/001* (2013.01); *G01N 29/0681* (2013.01); *G01N 29/26* (2013.01); *G01N 2291/023* (2013.01); *G01N 2291/101* (2013.01); *G06T 2207/10056* (2013.01); *G06T 2207/10132* (2013.01); *G06T 2207/20081* (2013.01); *G06T 2207/30148* (2013.01)

(58) Field of Classification Search
CPC ........... G06T 7/001; G06T 2207/10056; G06T 2207/10132; G06T 2207/20081; G06T 2207/30148; G06T 7/0004; G06T 2207/20104; G06T 7/11; G06T 2207/20224; G01N 29/0681; G01N 29/26; G01N 2291/023; G01N 2291/101; G01N 29/4436; G01N 29/4445; G01N 29/449; G06N 3/04; G06N 3/08; G06N 20/00; G06V 10/25; G06V 10/764; G06V 10/20
USPC ................................................ 382/100, 149
See application file for complete search history.

(56) References Cited

U.S. PATENT DOCUMENTS 9,898,811 B2 2/2018 He et al.
10,482,590 B2 11/2019 He et al.
(Continued)

*Primary Examiner* — Sheela C Chawan
(74) *Attorney, Agent, or Firm* — Leveque IP Law, P.C.; Krista Y. Chan

(57) ABSTRACT

In a method and apparatus for automated inspection, an image is acquired of an object under inspection and a difference image is generated showing the difference between the acquired image and a reference image of a defect-free object of the same type. Characteristics of the difference image, or detected isolated regions of the difference image, are passed to an automated defect classifier to classify defects in the object under inspection. The characteristics of the difference image may be pixels of the difference image or features determined therefrom. The features may be extracted using a neural network, for example. The automated defect classifier is trained using difference images and may be further trained, in operation, based on operator classifications and using simulated images of defects identified by an operator.

24 Claims, 7 Drawing Sheets

Related U.S. Application Data filed on Jan. 7, 2022, provisional application No. 63/280,511, filed on Nov. 17, 2021.

(56) References Cited

U.S. PATENT DOCUMENTS

| | | |
|---|---|---|
| 10,650,508 B2 | 5/2020 | Chang et al. |
| 2012/0141011 A1* | 6/2012 | Sakai ................. G01N 21/9501 382/149 |
| 2016/0358746 A1* | 12/2016 | Hirai ....................... G06T 7/001 |
| 2022/0301133 A1* | 9/2022 | Mariyappan ............... G06T 7/11 |
| 2023/0298327 A1* | 9/2023 | Katayama ............ G06V 10/776 382/145 |

* cited by examiner

METHOD AND APPARATUS FOR AUTOMATED DEFECT DETECTION

RELATED APPLICATIONS

This application claims the benefit of:
provisional application with Ser. No. 63/324,342, filed Mar. 28, 2022 and titled "Ultrasonic Defect Classification of Isolated Defects using Machine Learning,"
provisional application with Ser. No. 63/297,601, filed Jan. 7, 2022 and titled "Simulated Dynamic Pretraining for Automated Defect Classification," and
provisional application with Ser. No. 63/280,511, filed Nov. 17, 2021 and titled "Operator-in-the-loop Training of a Machine Learning Model."
The entire content of these applications is hereby incorporated by reference.

BACKGROUND

Following manufacture, devices may be inspected to detect defects. This prevents defective products from reaching the marketplace. As an aid to inspection, images of the device may be acquired. For example, optical microscopy images or scanning ultrasonic microscopy images may be used to aid detection of surface defects in small devices, while scanning ultrasonic microscopy images or x-ray images may be used to detect defects within a device.

Ordinarily, operators are trained to examine these images to identify defects in the devices. However, this requires extensive training and, in addition, the process is prone to errors due to low contrast defects, inter-operator variance, fatigue, and the sheer number of devices to be analyzed.

There are various methods of automated analysis of these images to detect defects. However, the number of different devices that may be analyzed, the intricacy of the devices themselves, and limited numbers of defect exemplars can result in great difficulties in having sufficient data to train automated classifiers.

BRIEF DESCRIPTION OF THE DRAWINGS

The accompanying drawings provide visual representations that will be used to describe various representative embodiments more fully and can be used by those skilled in the art to better understand the representative embodiments disclosed and their inherent advantages. In these drawings, like reference numerals identify corresponding or analogous elements.

DETAILED DESCRIPTION

Figure 1:
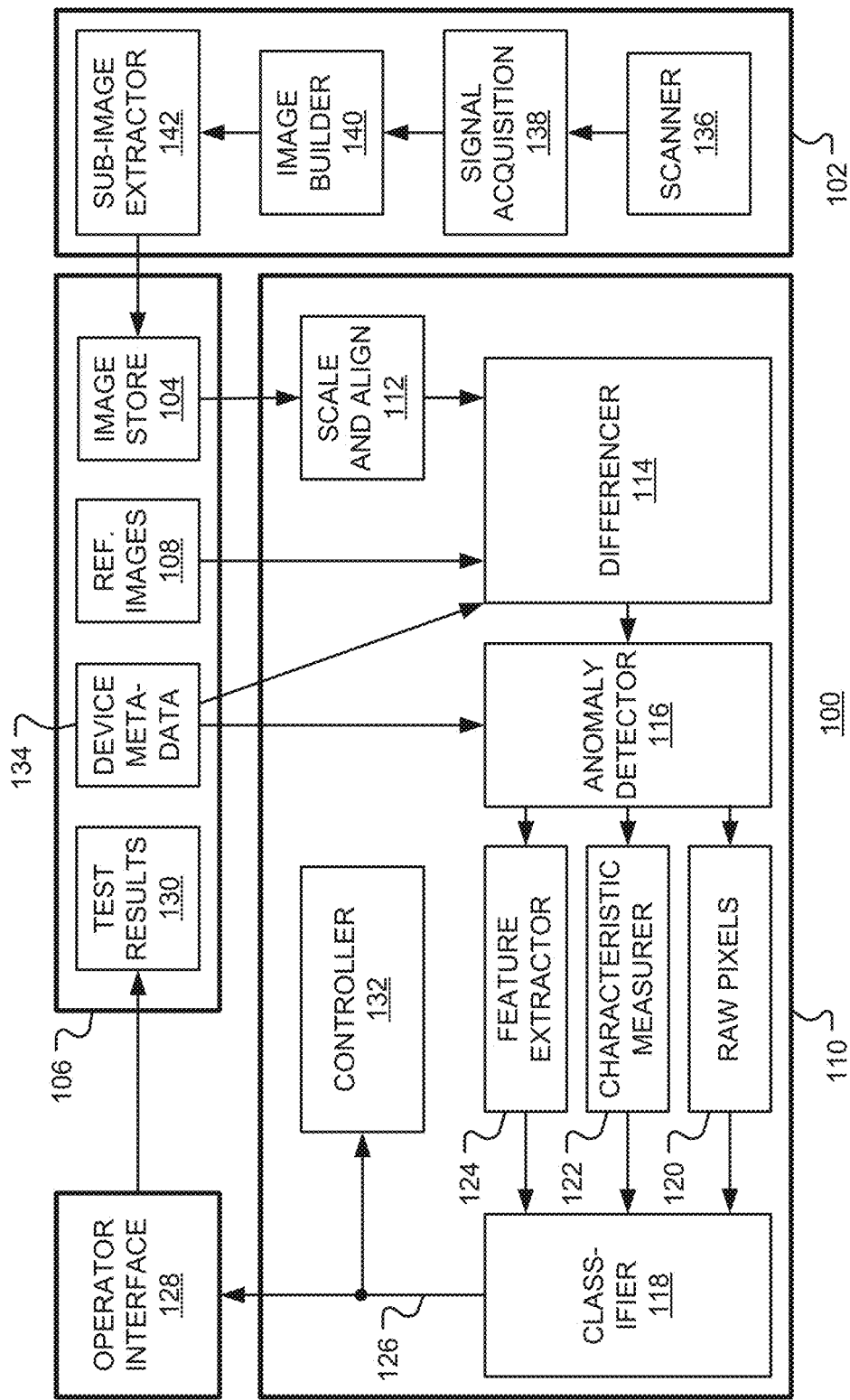
FIG. 1 is a block diagram of an automated defect classifier, in accordance with various representative embodiments.

The various apparatus and devices described herein provide mechanisms for automated detection and classification of defects in a device based on an acquired image of the device.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

Automated detection and classification of defects in a device may be based on an acquired image of the device. The image may be obtained by using a camera or detector to capture electromagnetic radiation such as visible light, infrared light or X-rays, for example. Alternatively, the images may be generated from a scan on the object, such as ultrasonic scan using a scanning acoustic microscope or a Magnetic Resonance Imaging (MRI) scan.

For example, in the environment of scanning ultrasonic microscopy for nondestructive testing of semiconductor devices, a mechanical scanning apparatus can move an ultrasonic transducer in orthogonal (X and Y) directions across the device under test, constructing an image from multiple reflected or transmitted pulses over the desired areas. The images of one or more such devices are the input to an automated defect classifier. Ultrasonic imaging is particularly good at identifying delaminations, voids, unintended fusions or bridges, cracks, and other such defects common to semiconductor analysis. These scans can be done on wafers, individual devices, semiconductor packages such as integrated circuits, and other such samples.

Ordinarily, operators are trained to examine these images to identify defects in the devices. This requires extensive training, and the process is prone to errors due to low contrast defects, inter-operator variance, fatigue, and the sheer number of devices that may be analyzed.

There are various methods of automated analysis of these images to find and classify defects. However, the number of different devices that may be analyzed, the intricacy of the devices themselves, and limited numbers of defect exemplars can result in great difficulties in having sufficient data to train automatic classifiers.

In prior automated systems, raw defect images or characteristics derived therefrom are used. The raw images include structure of the device under test, so an automated classifier must learn how to separate defects from the device structure. In accordance with the present disclosure, the differences between an acquired image and a reference image are used in the classification, rather than the raw images. This isolates the defect from the particular device types and simplifies the training process. The isolated defects in the difference images can be usefully analyzed based on classical image measurements such as size, shape, texture, contrast level, etc., with a classifier identifying these as defects such as cracks, scratches, voids, unintended fusions, and other such categories. Alternatively, the images can be analyzed using an ML-based classifier. As discussed below, the differences may be obtained in a number of ways, including simple subtraction of a reference image.

The identified defect type can optionally be associated with the defect location for more detailed classifications, such as a void on a particular part of the device.

One particular benefit of this approach is that isolated defect types can be seen in many different devices, allowing a trained classifier to be applied to multiple devices without the requirement of acquiring defect exemplars from every device produced, and training or retraining the classifier each time.

FIG. 1 is a block diagram of an apparatus 100 for automated defect classification, in accordance with various representative embodiments. Apparatus 100 includes an image capture device 102, such as a scanning ultrasonic microscope or camera, for example. Image capture device 102 produces a digital image that is stored in image store 104 in storage 106. Storage 106 also stores one or more reference images 108 for comparison with the acquired image. Apparatus 100 also includes one or more processors 110. These may include programmable processors, dedicated hardware or a combination thereof. Accordingly, storage 106 may also store a program of processor executable instructions. The one or more processors implement scale and align block 112, which adjusts, scales and normalizes the acquired image to align with the reference image better, and differencer 114 that determines the difference image. In one embodiment, the difference image is produced by subtracting pixel values of the reference image from pixel values of the acquired image (or vice versa). Other embodiments are described below. Optionally, when multiple reference images are available, statistics of variations between the images may be measured and used to scale the difference image. Detector 116 identifies, from the difference image, if any region shows a significant disparity or anomaly. In particular, the detector identifies isolated anomalies in the difference image. When an anomaly is detected, associated information is passed to classifier 118. The associated information may be pixels 120 of the difference image or the region of the difference image showing the disparity, or characteristics 122 of the region (such as shape, size, contrast, texture, location, etc.). In one embodiment, pixels are passed to an automated feature extractor 124, such as a neural network. Classifier 118 outputs classification information 126, including the defect class. The classification information may also include a pass/fail indicator. The corresponding classification may be displayed to a human operator via operator interface 128 and/or stored at 130 in storage 106, for example. Classification information 126 may also be passed to controller 132. Controller 132 may control transport and scanning of devices under test in response to the classification information. In addition to classification of a defect, classification information 126 may include the location and/or extent of a defect and a confidence level of the classification. To this end, storage 106 may also contain metadata 134 related to the expected variations between images of defect-free devices, together with additional information such as designations of the regions of interest or importance in the device under test.

In the example embodiment shown in FIG. 1, image capture device 102 is a scanning acoustic microscope that includes scanner 136, which insonifies an object under test at a number of scan positions, signal acquisition unit 138 that acquires signals from an ultrasound receiver and image builder 140 that measures time-gated signals and produces an image of received intensity at the scan positions in various time-windows. In one application, the object under test is a wafer containing multiple devices (chips). In this application, sub-image extractor 142 extracts images of individual devices to be inspected.

In one embodiment, the difference image at position i,j in the image is computed as the absolute difference $$d(i,j)=|y(i,j)-m(i,j)|,$$

where i and j are pixel indices, y(i,j) is the acquired image of the device under test, and m(i, j) is a mean reference image computed over N reference images $x_n(i,j)$ as $$m(i, j) = \frac{1}{N}\sum_{n=1}^{N} x_n(i, j).$$

In a further embodiment, the difference is a statistical difference computed as the absolute difference normalized by the standard deviation, namely $$d(i, j) = \frac{|y(i, j) - m(i, j)|}{\sigma(i, j) + \lambda}.$$

where $\lambda$ is a non-negative parameter and the standard deviation, $\sigma$, satisfies $$\sigma^2(i, j) = \frac{1}{N}\sum_{n=1}^{N}(x_n(i, j) - m(i, j))^2 = \frac{1}{N}\sum_{n=1}^{N} x_n^2(i, j) - m(i, j)^2.$$

Thus, a difference in a pixel value for which the standard deviation of the reference images is small will be given a higher weighting.

In a still further embodiment the difference image at position i,j is given by the minimum distance $$d(i, j) = \min_{n}|y(i, j) - x_n(i, j)|.$$

Other measures of difference may be used without departing from the present disclosure.

Figure 2:
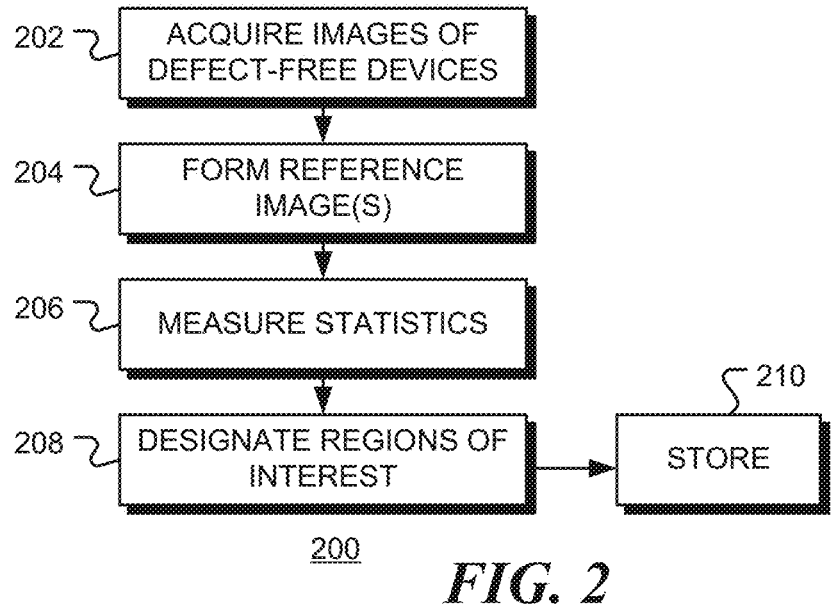
FIG. 2 is a flow chart of a method of generating one or more reference images for comparison with an acquired image, in accordance with various representative embodiments.

FIG. 2 is a flow chart 200 of a method of generating one or more reference images for comparison with an acquired image, in accordance with representative embodiments. Referring to FIG. 2, images of defect-free devices of the same type as the device under test are acquired at block 202. These may be images of different devices of the same type, for example. At block 204, the one or more reference images are formed. In one embodiment, the images are aligned and normalized (if required) and then averaged to provide a single reference image. At block 206, statistics of the defect-free images are measured. For example, the standard deviation of pixel values across the defect-free images may be computed. This allows for confidence testing of difference images or scaling of difference images. Optionally, at block 208, regions of interest for the device are designated.

Finally, at block 210, the one or more reference images, together with any measured statistics and designated regions of interest, are stored.

Figure 3:
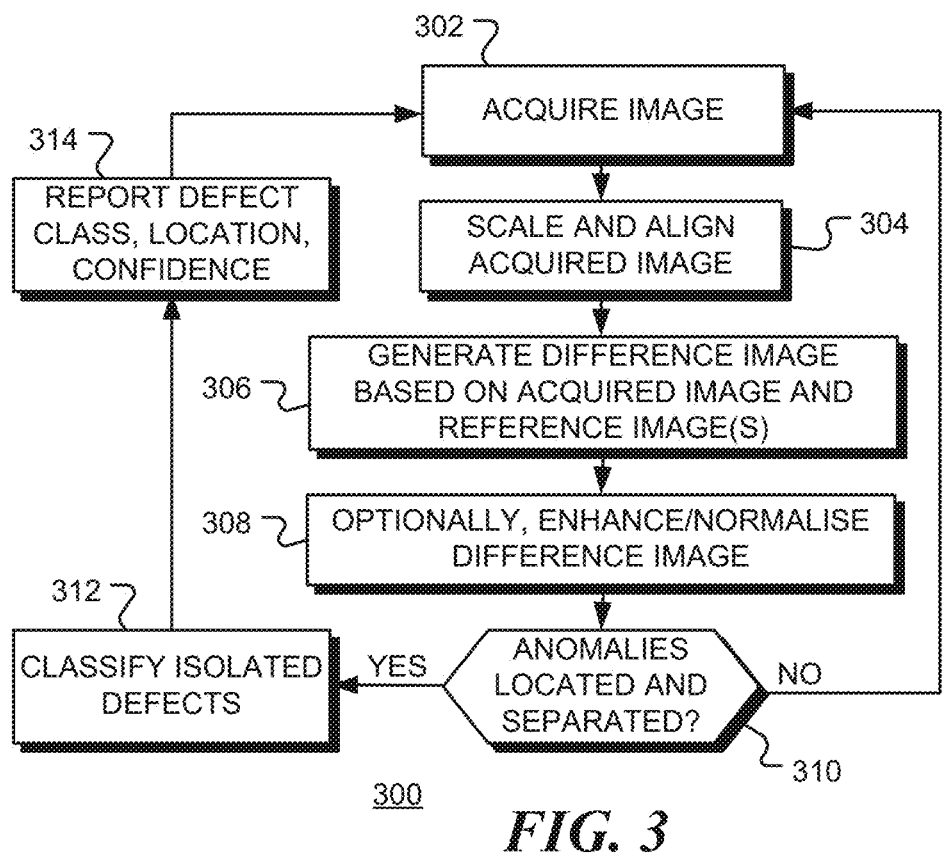
FIG. 3 is a flow chart of a method of detecting and classifying defects in a device, in accordance with various representative embodiments.

FIG. 3 is a flow chart 300 of a method of detecting and classifying defects in a device, in accordance with various representative embodiments. At block 302, an image of the device under test is acquired. The image can by acquired using a camera or scanner, for example. Alternatively, the image could be retrieved from a database of stored images. At block 304, the image is scaled and aligned to match the reference image better. For example, the image may be normalized based on intensity or contrast, translated and/or rotated, and expanded or contracted. The alignment may be performed on a sub-pixel scale for improved accuracy. At block 306, a difference image is generated between the acquired image and the reference image. The difference image may be scaled by the measured statistics of device-to-device variation.

Optionally, at block 308, the difference image is enhanced by applying edge enhancement, texture extraction, or other image processing operations.

At decision block 310, it is determined if the differences indicate a defect in the device under test. This may be done by detecting isolated anomalies in the designated regions of interest. In one embodiment, the isolated anomalies are measured by size, angle, shape, texture, contrast, and other such characterizations. If no defect is indicated, as depicted by the negative branch from decision block 310, the device is judged to be free from defects and flow returns to block 302. Otherwise, as depicted by the positive branch from decision block 310, the difference image, or the measured characterizations, are passed to an automated defect classifier. The detection may utilize thresholds such as a minimum difference intensity, minimum size, minimum intensity relative to reference deviations, or other such criteria that must be met before passing on the difference for classification.

At block 312, the isolated defects are identified and classified by the automated defect classifier. In addition, an indication of a confidence level of the classification may be produced based on the statistics of the reference images, together with a location of the defect. At block 314, the defect class and locations are reported, together with a confidence level of the classification. Flow then returns to block 302.

In one embodiment, the classifier may be trained using K-Means clustering of characteristics of previously identified defects, returning a classification of that current difference into one of the designated defect categories. Alternatively, low confidence classifications may be grouped as unclassified differences, and optionally returned for manual inspection. Other embodiments of the disclosure may use other kinds of classifiers, such as Bayes classifiers, neural networks, or other classifiers known in the realm of machine learning, any of which consist of a single classifier that returns one of multiple potential identifications and confidence strengths.

In the method described above, the classifier is not required to distinguish between specific structure of a device and a defect, since the device structure is removed by the differencing process, thereby isolating the defect. A major benefit of this approach is that the classifier does not have to be retrained for different devices. It is sufficient to train the classifier to recognize different classes of isolated defects.

The classifier may use characteristics of the identified defect, such as size, angle, shape, texture and contrast. Alternatively, feature vectors for classification may be obtained automatically from the raw difference pixel data. In one embodiment, raw pixel data is passed to a convolutional neural network (CNN), or other neural network, to extract features that are then fed into a feature-based classifier.

Thus, using one or more reference images of known good devices, a difference of sample images from the references are determined. Only the differences or measured characteristics of the differences are used for detection and classification.

The classifier (and CNN or other feature generator, if used) may be trained using training data in the form of previously identified, manually classified, and labeled defects. However, since only extracted differences between the sample and reference image(s) are fed into the classifier, different semiconductor devices may be tested without retraining the classifier.

The confidence level of a classification can also be reported and differences that are not classified with sufficient confidence can be reported for manual examination.

In summary, defects in inspection images (such as ultrasonic scans of semiconductor devices) are classified by isolating the defects as the differences between device images and one or more reference images, using multiple measurements of those defect differences to differentiate between multiple defect categories. Differences with low classification confidences can also be referred to manual consideration as needed.

Operator in the Loop.

Machine Learning (ML) model training is typically a lengthy process that occurs prior to deploying a trained model into a production environment. During this training period, users get no value from the model. Additionally, users typically don't know if the ML model will work in a real-world environment without performing extensive testing, which further delays deployment. Embodiments of this disclosure seek to eliminate the lengthy pretraining, while simultaneously providing immediate value to operator productivity. An added benefit is that the ML model is continuously being testing with real-world data in a production environment eliminating the risk of "data shift." Data shift is a mismatch between the data on which the AI was trained and tested and the data it encounters in the real-world.

Figure 4:
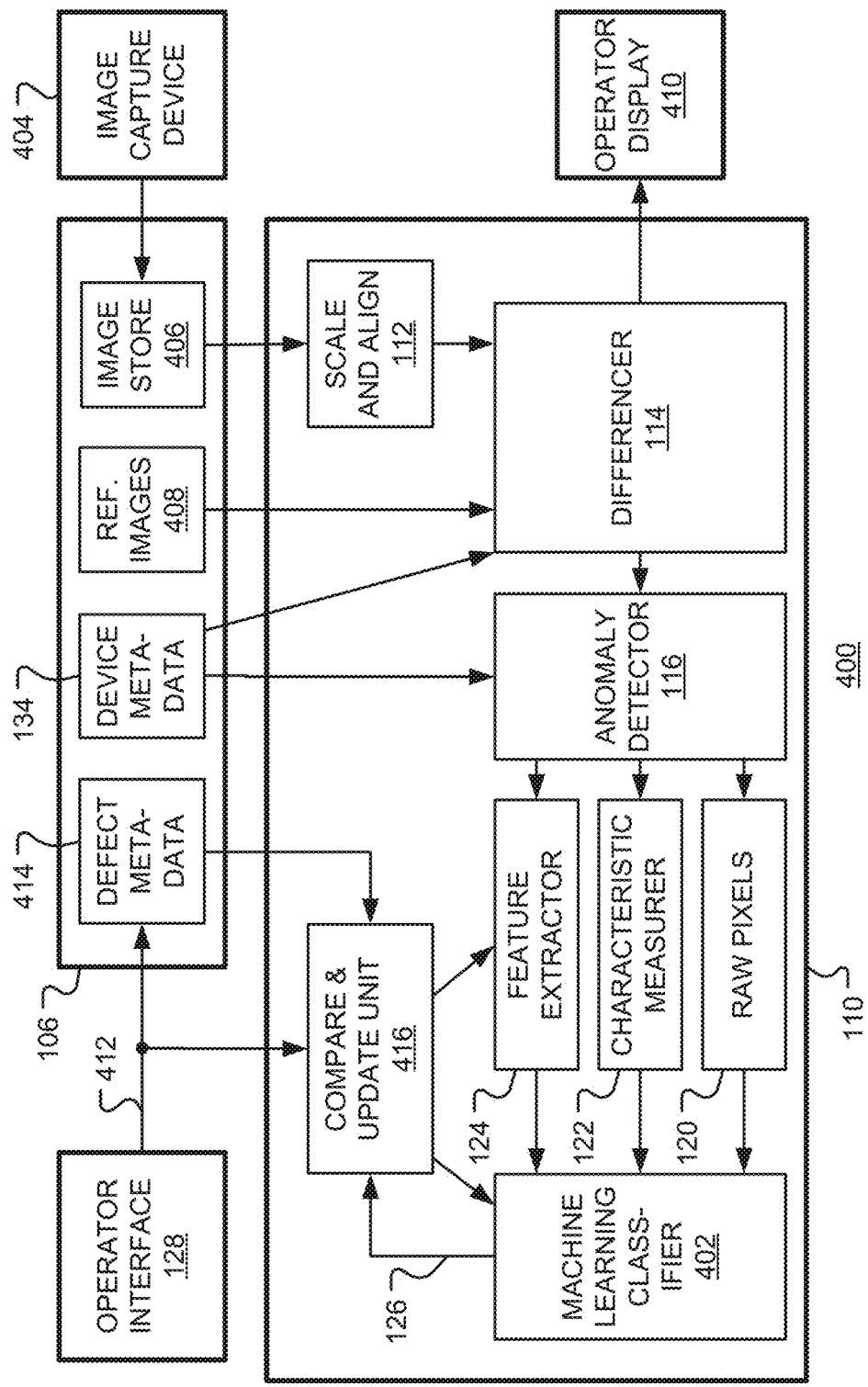
FIG. 4 is a block diagram of an apparatus for training a Machine Learning (ML) model used for defect classification in an inspection system, in accordance with various representative embodiments.

FIG. 4 is a block diagram of an apparatus 400 for training a Machine Learning (ML) model used for defect classification in an inspection system, in accordance with various representative embodiments. The inspection system may be, for example, an ultrasonic inspection and defect detection system for semiconductor devices. In the example shown, ML-based classifier 402 is first initialized with a base ML model—such as that trained on a different semiconductor device. As described above, since structural details of the device are removed by differencer 114, the base ML model provides at least some performance. An image of a device under test is acquired by image capture device 404 and the resulting image is stored at 406 in memory 106. As described above, differencer 114 forms a difference image using one or more reference images 408, and any detected defects are classified by ML-based classifier 402 to provide classification information 126. The difference image is also displayed on operator display 410, enabling a trained operator to identify and classify the defect. The operator classification may be used to update image metadata 414 so that the acquired image can be used for training at a later time. The operator classification 412 and the ML-based classification are compared in compare and update unit 416. Based on the comparison, the accuracy of the classifier is updated. Optionally, feature extractor 124 may also be updated. If the classifier is not sufficiently accurate, the operator classification is used to update the classifier to provide improved performance. When the classifier is judged to be sufficiently accurate, the operator is no longer needed. The update may signal the operator when this occurs. Alternatively, the compare and update unit 416 may report the current accuracy level to the operator so that the operator can determine if sufficient accuracy has been achieved.

In the embodiment shown in FIG. 4, defect classification data is received from a single image capture device 404 that may be local to or remote from the operator. However, in other embodiments, classification data may be received from multiple inspection stations and used to update the same ML model. This has the added benefit of accounting for possible variation between scan tools. Additionally, multiple operators may update an ML-model that is shared between multiple stations.

Figure 5:
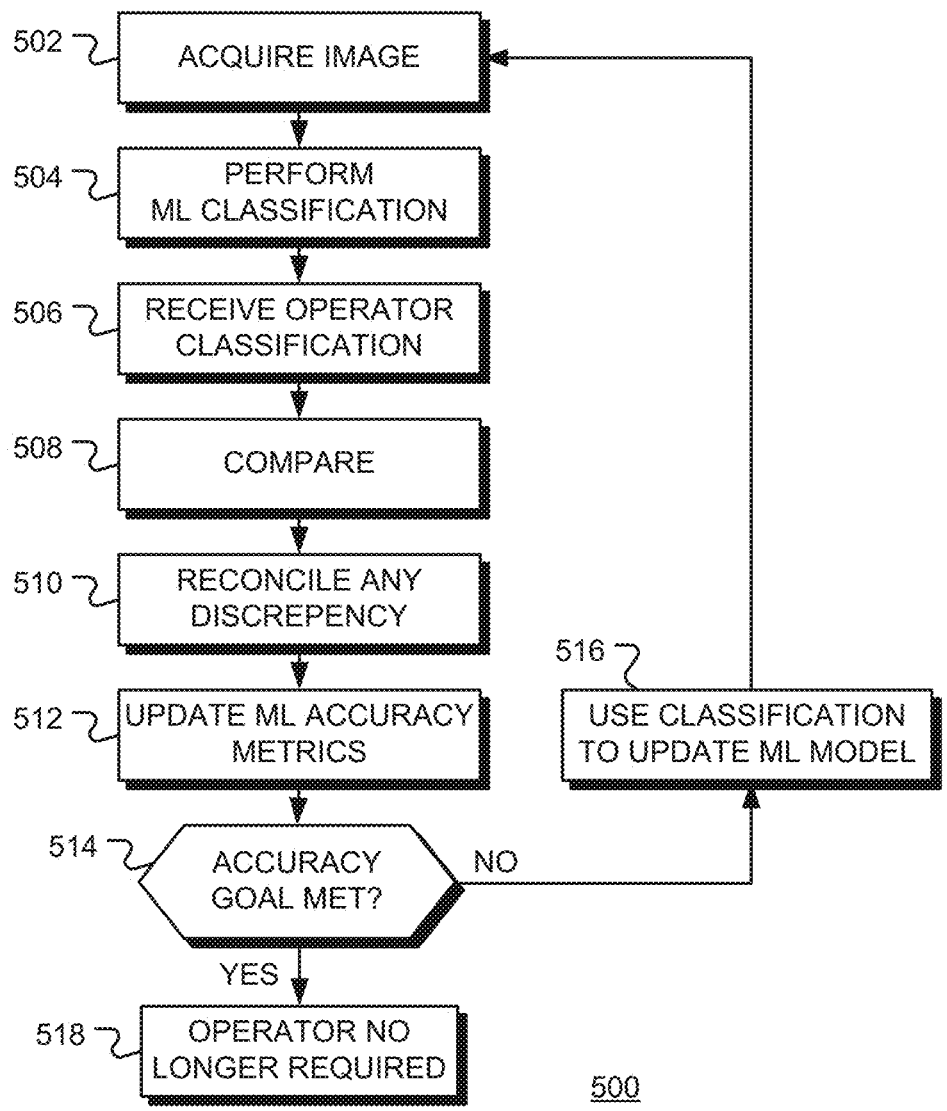
FIG. 5 is a flow chart of a method of updating an ML-based automated defect classifier, in accordance with various representative embodiments.

FIG. 5 is a flow chart of a method 500 of updating an ML-based automated defect classifier, in accordance with various representative embodiments. An image of a device under test is acquired by an image capture device at block 502. A defect in the image is classified at block 504 based on a difference between the captured image and one or more reference images. A classification of the defect is received from an operator at block 506, based on a difference image displayed to the operator. The operator classification may be used to update image metadata so that the captured image may be used for training at a later time. The operator classification and the ML-based classification are compared at block 508. Any discrepancy in the classifications is resolved by the operator at block 510. Based on the comparison, a measure of the accuracy of the automated defect classifier is updated at block 512. If the classifier is not sufficiently accurate, as indicated by the negative branch from decision block 514, the operator classification is used to update the classifier at block 516 to provide improved performance, and flow returns to block 502. Otherwise, as depicted by the positive branch from decision block 514, the classifier is judged to be sufficiently accurate and the operator is no longer needed, as indicated by block 518. The updater may signal the operator when this occurs.

Simulated Training Images

Component-to-component, run-to-run, and part-to-part variances make it difficult to build generic libraries for automated inspection. Pretraining an Automated Defect Classifier (ADC) requires processing a large number of images (typically thousands) representing actual components with and without defects. These images may be difficult to obtain—especially for a new device. An embodiment of the present disclosure creates pretraining materials for ADC dynamically, so that more defects can be captured earlier in the system and with less human intervention.

Figure 6:
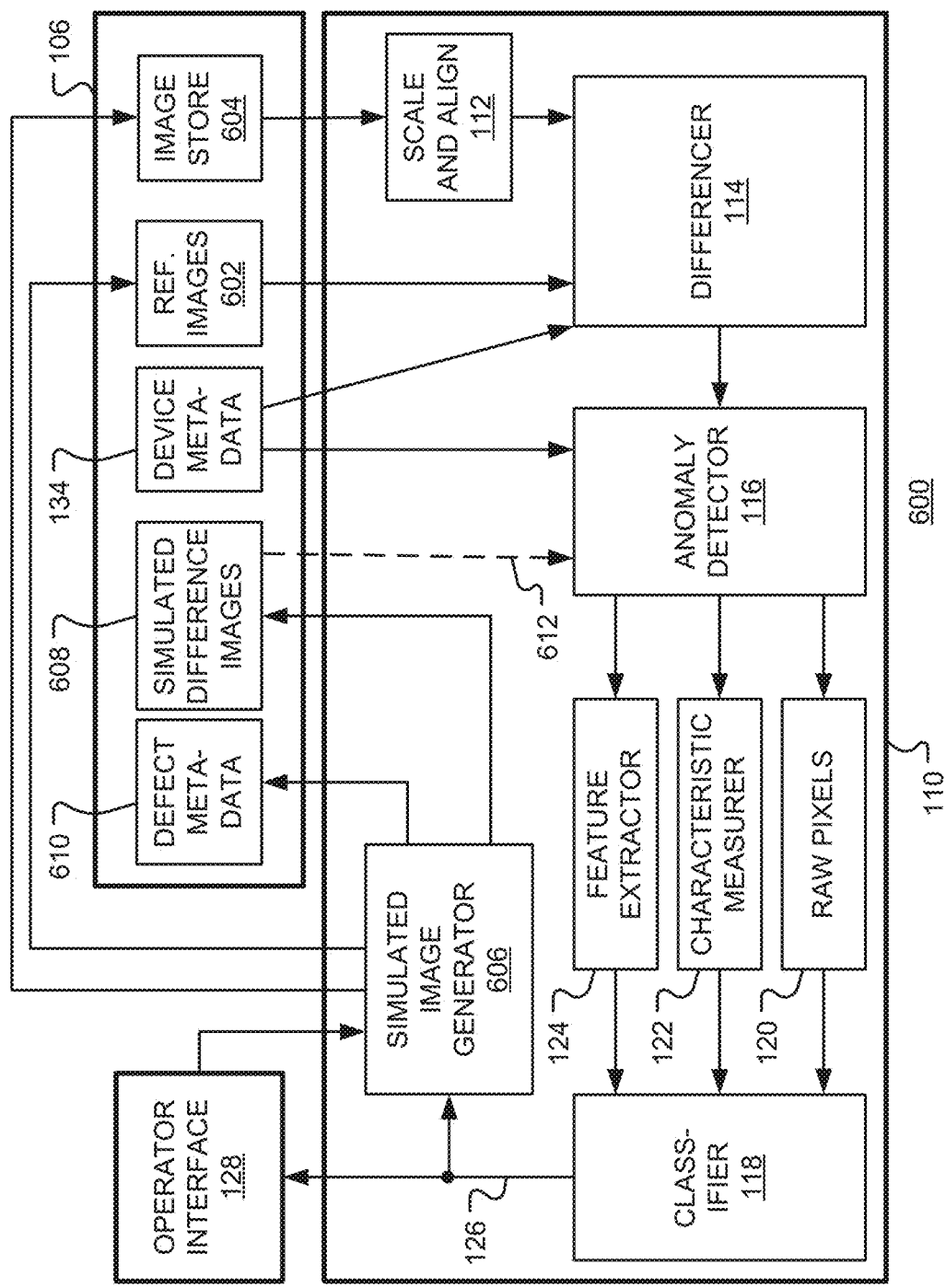
FIG. 6 is a block diagram of an apparatus for training an automated defect classifier, in accordance with various representative embodiments.

FIG. 6 is a block diagram of an apparatus 600 for training an automated defect classifier (ADC), in accordance with various representative embodiments. Referring to FIG. 6, one or more reference images of defect-free devices of the same type are stored at 602 in storage 106. As described above, differencer 114 and classifier 118 are used to classify defects detected in the acquired images stored at 604. The resulting classifications are passed to an operator via operator interface 128. When a defect is detected, characteristics of the defect may be passed to simulated-image generator 606 which creates simulated difference images containing the defect in multiple different (feasible and infeasible) views. The simulated difference images are stored at 608. Classification labels for the image, together with any statistics used in the simulation, are stored in metadata store 610. The simulated difference images provide training material that can be used to train the ADC to recognize defects. These may be used in conjunction with conventional (non-simulated) training materials. During training, the simulated difference images are passed directly to anomaly detector 116, as depicted by dashed arrow 612. The difference between the classification produced by classifier 118 and the label in metadata 610 is used to update the classifier and, optionally, feature extractor 124.

In a further embodiment, simulated-image generator 606 generates simulated images with and without the defect. The defect-free images, stored at 602, do not need to be device images—they can be any images. Noise may be added to one or both of the defect-containing and defect-free images.

The images to be inspected may be obtained dynamically as devices are scanned. When an operator identifies a defect, that defect can be flagged and used to trigger the generation of multiple simulated images. This may occur for defects that the ADC has classified correctly, mis-classified or has failed to detect. New classes of defects can also be added. In this way, the library of training images may be greatly enlarged compared to using only scanned or captured images.

It is emphasized that the ADC is trained on differences only, thus defect-free structure of the device is removed before detection and classification is performed. In this way, defects, such as a delaminated solder bump in a silicon chip for example, can be recognized in a new device without a need to train the ADC for the new device.

Figure 7:
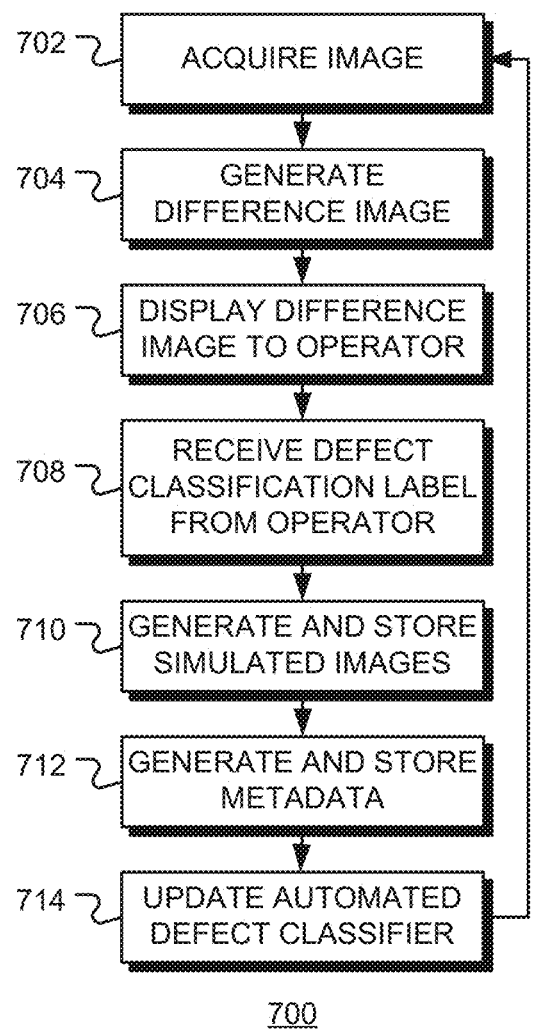
FIG. 7 is a flow chart of a method of generating training material for an automated defect classifier, in accordance with various representative embodiments.

FIG. 7 is a flow chart 700 of a method of generating training material for an automated defect classifier, in accordance with various representative embodiments. At an inspection station, an image of a device under test is acquired at block 702. A difference image is obtained at block 704 and displayed to an operator of the inspection station at block 706. At block 708, a classification label of a defect visible in the difference image is received from the operator. The label may be a label of an existing class of defect or a new class of defect. Simulated images, containing the labeled defect, are generated at block 710. The simulated images are based, at least in part, on the identified region of the image of the object under inspection. At block 712, the label and other metadata associated with the simulated images are stored for future use. The automated defect classifier is updated at block 714, based on the plurality of simulated images and the received classification label, and flow returns to 702. In this manner, the number of training samples is increased, and the classifier is updated to provide greater accuracy. In addition, new classes of defect may be identified and included in the training materials.

Figure 8:
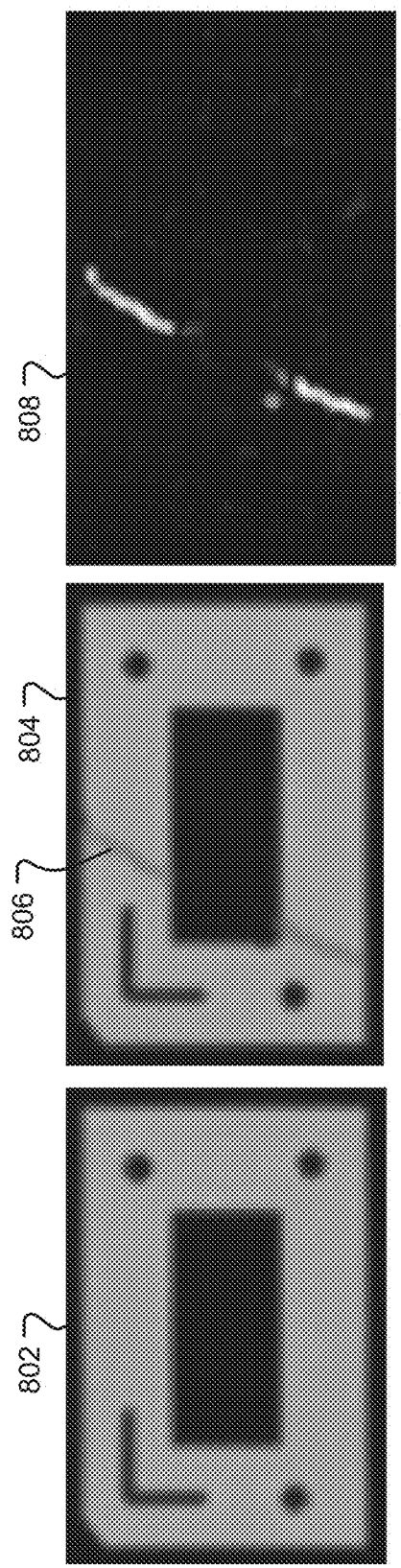
FIG. 8 shows example images, in accordance with various representative embodiments.

FIG. 8 shows example images, in accordance with various representative embodiments. Image 802 is a reference image that is free of defects. Image 804 is an acquired image showing a defect in the form of scratch 806. Image 808 is a difference image, obtained as a statistical difference between reference image 802 and acquired image 804.

In accordance with an example embodiment, an ultrasonic scanning device returns images built from the reflection or transmission of multiple pulses into a sample under test. Difference images are generated representing the difference between the built image and one or more reference images of known good devices. Only the difference image, or information extracted from it, is passed along for classification. Optionally, differences may be scaled by observed statistics such as the standard deviation of reference images across the devices. Optionally, differences may be filtered by edge enhancement, texture extraction, or other image processing operators to enhance those differences. Optionally, there may be thresholds such as a minimum difference intensity, minimum size, minimum intensity relative to reference deviations, or other such criteria that must be met before passing on the difference for classification.

Measurements may be made of any detected differences, including position, size, shape, texture, contrast, orientation, etc. In one embodiment, feature extraction of the difference image is performed by a convolutional neural network, providing some set of features that are fed into the classifier, together with the more traditionally computed features. These features are in and of themselves not a classification, simply additional features for the later classifier.

Training data for the classifier may be provided in the form of previously identified, manually classified, and labeled defects. The classifier compares measured vectors of difference features against known categories of defects, reporting what the best match is. Using only extracted differences between the sample and reference image(s) allows further analysis to apply to multiple sample types, such as different semiconductor devices, without retraining the classifier. The classifier may use K-Means clustering, for example, or it may be a Bayes classifier, a neural network trained on the labeled data, or other machine-learning classifier known to those of skill in the art. In an embodiment, the confidence of the classification is determined and reported. Optionally, differences that are not classified with sufficient confidence can be reported for manual examination.

In summary, embodiments of the disclosure provide mechanisms for classifying defects in ultrasonic scans of semiconductor devices, or other images, using machine learning to identify the defect types. Embodiments generally isolate the defects as the differences between device images and a reference image, using multiple measurements of those defect differences to differentiate between multiple defect categories. Differences with low classification certainties can also be referred to manual consideration as needed.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of automated inspection comprising:
acquiring an image of an object under inspection;
generating a difference image between the acquired image and a reference image of an object of the same type as the object under inspection, wherein the reference image comprises statistics of the reference image of the object under inspection and the difference image comprises a statistical difference between the reference image and the acquired image based on the statistics of the reference image; and
passing characteristics of the difference image to an automated defect classifier to classify defects in the object under inspection, where the characteristics of the difference image include pixels of the difference image or features determined therefrom.

2. The method of claim 1, further comprising:
detecting an isolated region containing an anomaly in the difference image,
where the characteristics of the difference image passed to the automated defect classifier include pixels of the difference image in the isolated region or features determined therefrom.

3. The method of claim 1, where generating the difference image includes computing a pixel-by-pixel difference between pixels of the acquired image and pixels of the reference image.

4. The method of claim 1, further comprising adjusting the acquired image prior to generating the difference image, where said adjusting includes one or more of rotating, translating, scaling, intensity normalization and contrast normalization.

5. The method of claim 4, where the adjusting is based on minimizing a measure of the difference between the acquired image and the reference image.

6. The method of claim 1, further comprising generating the reference image as a mean of a plurality of images of one or more defect-free objects of the same type as the object under inspection.

7. The method of claim 1, further comprising:
determining a standard deviation of a plurality of images of one or more objects of the same type as the object under inspection; and
identifying one or more defects in the object based, at least in part, on the calculated standard deviation.

8. The method of claim 7, further comprising scaling values of the difference image based on the determined standard deviation.

9. The method of claim 1, further comprising:
displaying the difference image of the object to a human operator;
receiving, from the human operator, a classification label of a defect visible in the difference image; and
updating the automated defect classifier based on the classification label.

10. The method of claim 9, where the classification label is an existing classification label or a new classification label.

11. The method of claim 9, further comprising:
comparing a classification label received from the human operator to a classification label generated by the automated defect classifier; and
updating a measure of accuracy of the automated defect classifier based on a result of the comparison.

12. The method of claim 11, further comprising:
comparing the measure of accuracy to a threshold value; and
enabling fully automated defect classification when the measure of accuracy exceeds a threshold value.

13. The method of claim 1, further comprising:
identifying, based on the difference image, a region of the image of an object under test containing a defect in the object under test;
displaying the region of the image to a human operator;
receiving, from the human operator, a classification label of a defect visible in the region of the image;
generating a plurality of simulated images containing the labeled defect, the simulated images based, at least in part, on the identified region of the image of the object under inspection; and
updating the automated defect classifier based on the plurality of simulated images and the received classification label.

14. The method of claim 13, the simulated images comprise difference images.

15. The method of claim 1, where acquiring the image of the object under inspection includes:
performing an ultrasonic scan of the object under inspection to generate a plurality of response waveforms;
time-gating the response waveforms; and
building the image of the object under inspection based on the time-gated waveforms.

16. The method of claim 1, where acquiring the image of the object under inspection includes capturing an image of reflected or transmitted electromagnetic radiation.

17. The method of claim 1, where acquiring an image of an object under inspection includes retrieving the image from a database of images.

18. An apparatus comprising:
an image capture system configured to acquire an image of an object under inspection;
an image differencer configured to receive the acquired image and generate a difference image between the acquired image and a reference image of an object of the same type as the object under inspection, wherein the reference image comprises statistics of the reference image of the object under inspection and the difference image comprises a statistical difference between the reference image and the acquired image based on the statistics of the reference image; and
an automated defect classifier configured to detect and classify defects in the object under inspection based on the difference image or features derived therefrom.

19. The apparatus of claim 18, further comprising:
a detector configured to detect a region in the difference image containing an anomaly, where the automated defect classifier is configured to detect and classify defects in the object under inspection based on the detected region in the difference image or features derived therefrom.

20. The apparatus of claim 19, further comprising:
a Machine Learning (ML) based feature extractor,
where the derived features consist of features extracted by the ML-based feature extractor from the detected region in the difference image.

21. The apparatus of claim 19, further comprising:
a display configured to display the difference image of the object to a human operator;
an operator interface configured to receive, from the human operator, a classification label of a defect visible in the difference image; and
an updater configured to updating the automated defect classifier based, at least in part, on the classification label.

22. The apparatus of claim 19, further comprising:
a simulated image generator configured to generate a plurality of simulated difference images containing the labeled defect, the simulated images based, at least in part, on the detected region in the difference image and contained the labeled defect in one or more configurations.

23. The apparatus of claim 19, further comprising:
a simulated image generator configured to generate a plurality of simulated images containing the labeled defect and one or more corresponding defect-free images, the simulated images containing the labeled defect based, at least in part, on the detected region in the difference image and contained the labeled defect in one or more configurations.

24. The apparatus of claim 18, further comprising storage for:
   the image of the object under inspection;
   the reference image and
   metadata of the object under inspection including descriptors the regions of interest in the object under inspection.

* * * * *